(12) United States Patent
Kerr et al.

(10) Patent No.: US 7,064,343 B2
(45) Date of Patent: *Jun. 20, 2006

(54) HIGH SPEED COUNTERBALANCED TRANSLATION DEVICE FOR USE WITH RADIOGRAPHIC MEDIA

(75) Inventors: Roger S. Kerr, Brockport, NY (US); Seung-Ho Baek, Pittsford, NY (US); Thomas A. Mackin, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 290 days.

This patent is subject to a terminal disclaimer.

(21) Appl. No.: 10/744,541

(22) Filed: Dec. 22, 2003

(65) Prior Publication Data

US 2005/0133749 A1 Jun. 23, 2005

(51) Int. Cl.
*G03B 42/08* (2006.01)

(52) U.S. Cl. .................................................. 250/589

(58) Field of Classification Search ................ 250/589
See application file for complete search history.

(56) References Cited

U.S. PATENT DOCUMENTS

| RE31,847 E | 3/1985 | Luckey |
| 6,355,938 B1 * | 3/2002 | Cantu et al. ............. 250/584 |
| 2005/0133747 A1 * | 6/2005 | Kerr et al. ................ 250/584 |

* cited by examiner

*Primary Examiner*—Constantine Hannaher
(74) *Attorney, Agent, or Firm*—Busk op LawGroupP.C.

(57) ABSTRACT

A high speed counterbalanced translation device for use with radiographic media (21) with a scanning stage (10) adapted for movement in a first and second direction (11, 13) along a first axis (14); a balancing stage (12) disposed opposite the scanning stage for movement in a third and fourth direction (15, 16) along a second axis (17); a scanning module (18) mounted on the scanning stage; a counterbalance module (19) attached to the balance stage with a weight and size that complements the scanning module; and a continuous drive cable (20) with a first pin (22) for sequentially moving the scanning stage from a first to a second position (25, 27); a second pin (30) for moving the balancing stage simultaneously with the scanning stage initially in a third to the fourth position (29, 31); wherein the first pin moves the balancing stage from the fourth to the third position while second pin moves the scanning stage from the second to the first position.

18 Claims, 8 Drawing Sheets

HIGH SPEED COUNTERBALANCED TRANSLATION DEVICE FOR USE WITH RADIOGRAPHIC MEDIA

CROSS REFERENCE TO RELATED APPLICATIONS

Reference is made to commonly-assigned copending U.S. patent application Ser. No. 10/744,538filed Dec. 22, 2003, entitled A HIGH SPEED SCANNING DEVICE AND FILM WRITER FOR USE WITH RADIOGRAPHIC MEDIA, by Kerr et al.; and U.S. patent application Ser. No. 10/745,316, filed Dec. 22, 2003, entitled A HIGH SPEED SCANNING DEVICE FOR USE WITH RADIOGRAPHIC MEDIA, by Kerr et al., the disclosures of which are incorporated herein.

FIELD OF THE INVENTION

The invention relates in general to radiography and in particular to scanning one side of a radiographic media while counterbalancing the scanning head.

BACKGROUND OF THE INVENTION

In a photo-stimulatable phosphor imaging system, as described in U.S. Pat. No. RE 31,847, a photo-stimulatable phosphor sheet is exposed to an image wise pattern of short wavelength radiation, such as x-radiation, to record a latent image pattern in the photo-stimulatable phosphor sheet. The latent image is read out by stimulating the phosphor with a relatively long wavelength stimulating radiation such as red or infrared light. Upon stimulation, the photo-stimulatable phosphor releases emitted radiation of an intermediate wavelength such as blue or violet light in proportion to the quantity of short wavelength radiation that was received. To produce a signal useful in electronic image processing, the photo-stimulatable phosphor sheet is scanned in a raster pattern by a beam of light to produced emitted radiation, which is sensed by a photo-detector such as a photo-multiplier tube to produce the electronic image signal. The signal is then transmitted to a separate device, a film writer, which reproduces the scanned image.

A need exists for a method to scan radiographic images from radiographic media that uses a counterbalanced drive system so that the scanning rates are improved and the image quality improves.

SUMMARY OF THE INVENTION

Briefly, according to one aspect of the present invention a high speed counterbalanced translation device is used with a radiographic scanner. The translation device includes a scanning stage adapted for movement in a first and second direction along a first axis and a balancing stage disposed opposite the scanning stage adapted for movement in a third and fourth direction along a second axis. The translation device also includes a scanning module mounted on the scanning stage and a counterbalance module attached to the balance stage. The counterbalance module has a weight and size that complements the weight and size of the scanning module. The translation device also has a continuous drive cable engaging a drive pulley with a drive motor for rotating the drive pulley.

The continuous drive cable on the translation device includes a first pin for sequentially moving the scanning stage in from a first to a second position by engaging the first scanning stage slot located in the scanning stage. A second pin in the continuous drive cable moves the balancing stage simultaneously with the scanning stage initially in a third position to the fourth position by engaging the balancing stage slot. In sequence, the first pin moves the balancing stage from the fourth position to the third position while second pin moves the scanning stage from the second position to the first position.

The invention and its objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

Figure 1:
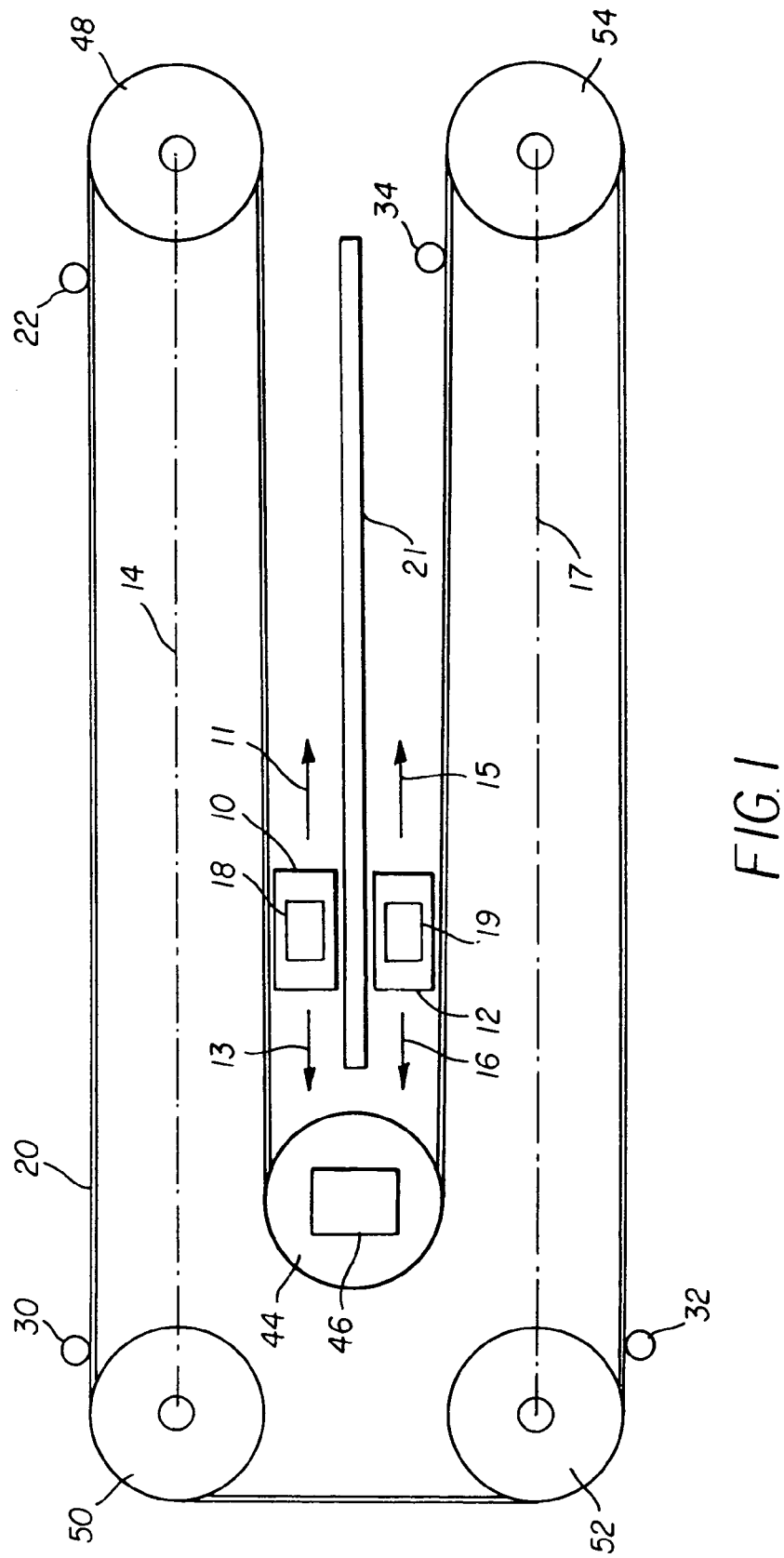
FIG. 1 is a schematic of the invention.

The present invention will be directed in particular to elements forming part of, or in cooperation more directly with the apparatus in accordance with the present invention. It is to be understood that elements not specifically shown or described may take various forms well known to those skilled in the art.

The invention was designed for creating higher image quality in scanned radiographic images while providing for a high speed, ultra stable scanning device. In a preferred embodiment, the radiographic images are a phosphorous plate.

Referring now to FIGS. 1 through 5, a scanning stage 10 is adapted for movement in a first direction 11 and a second direction 13 along a first axis 14. As a counter balance to the scanning stage, a balancing stage 12 is disposed opposite the scanning stage. The balancing stage moves in a third direction 15 and a fourth direction 16 along a second axis 17. It should be noted in the preferred embodiment, the first axis is parallel to the second axis. A scanning module 18 is disposed over the scanning stage for scanning radiographic media 21 that is placed on the scanning stage. A counterbalance module 19 is disposed on the balance stage that has a weight and size to complement the scanning module.

The scanning module has a housing and a reflective center chamber, such as a mirrored container, in the housing that can have an elliptical design. The module contains a laser that transmits a beam of light onto a radiographic plate, such as a phosphorous plate to create an image with a high sensitivity, around 0.7 mj/cm2, an image quality as good as 300 dpi, and a rate of productivity that is preferably between 80 plates per hour and 120 plates per hour. The module can have a small compact design, such as with a diameter of 15 mm to 23 mm, preferably 20 mm, and a length that creates as an ellipsoid with a surface calculated from the following formula:

$$(x2/9.64372)+(y2/9.64372)+((z-11)2/172)=1$$

The scanning module is adapted for emitting light to and collecting light from a photo-stimulatable radiographic sheet, such a phosphorous sheet or other similar radiographic sheet, filtering that light and then converting the light into a digital signal.

The integrated scanning module can be used for line scanning or swath scanning. To operate the module, a laser disposed in a housing emits a beam of light onto the graphic sheet. In the most preferred embodiment, one laser is used per module. It is contemplated that multiple housing can be connected together, in parallel to form a swath for scanning over multiple spots. The beam, which is preferably from a Hitachi single mode 635 nm, 35 mW laser or alternatively a multi mode 635 nm, 100 mW laser could be used. The beam is directed at discrete spots on the radiographic plate that already contains latent images.

The beam stimulates the radiographic plate to produce light that is collected by the module, in a preferably cylindrical, ellipsoid shaped mirrored container. A minor amount of reflected light may be collected as well.

A blue filter is used to selectively pass only the light from the radiographic image to a light detector that is preferably a PMT device, (at least one photo-multiplier tube) or a solid state photodiode. The filter is of the type Hoya 390 or B 410 from Tokyo, Japan or alternatively Schott BG–1 or BG 3 filter available from Schott of Mainz, Germany.

The light detector, such as a PMT made by Hamamatsu or a photomultiplier type R7400U available from Japan, receives the filtered light and generates a signal. The signal is transmitted to an analog to digital converter is usable to provide a digital signal. The digital signal is then stored as an image frame in a control processor, such as a computer like as a PC or Macintosh (Mac).

Next, the digital image can be processed depending on the needs of the user. For example, the digital image could then be printed on black and white x-ray film.

The scanning module is contemplated for use as an input scanner. Multiple modules can be used to scan a radiographic plate. Alternatively, only one module can be used to scan for individual spots on a plate. Both individual and multiple modules can be used to swath scan, diagonally, multiple spots on the plate.

Further, individual modules can be placed on a rotating disc over a stationary plate to achieve faster scanning of an image than with the line scanning method. The use of the modules on a rotating disc provides a more smooth, more even scanning of the image. Alternatively, the plate can be rotated and the modules held stationary to achieve a smooth scan of the image.

A counterbalance 19 is mounted to the second scanning stage to provide scanning from another direction of the same media. Preferably, the second scanning module is mounted so as to provide a counterbalance as well as the additional scanning advantage in the device. In a preferred embodiment, the second scanning module is mounted beneath the radiographic media and the first scanning module is mounted above the radiographic media.

The counterbalance can be made of any material, including but not limited to metal, plastic, composites, and particularly polycarbonates. Preferably, the counterbalance is screwed onto the balance stage or otherwise mechanically attached or welded to the balance stage. The size of the counterbalance is only dependent on what is needed to complement the scanning stage and the relative position in the frame. The weight, height, and size are tuned to compliment the selected head for scanning.

The counterbalance can be rectangular in shape, and flat, or round and squat, or small and very heavy, depending on what is needed to minimize vibration and increase stability in the device.

Figure 2:
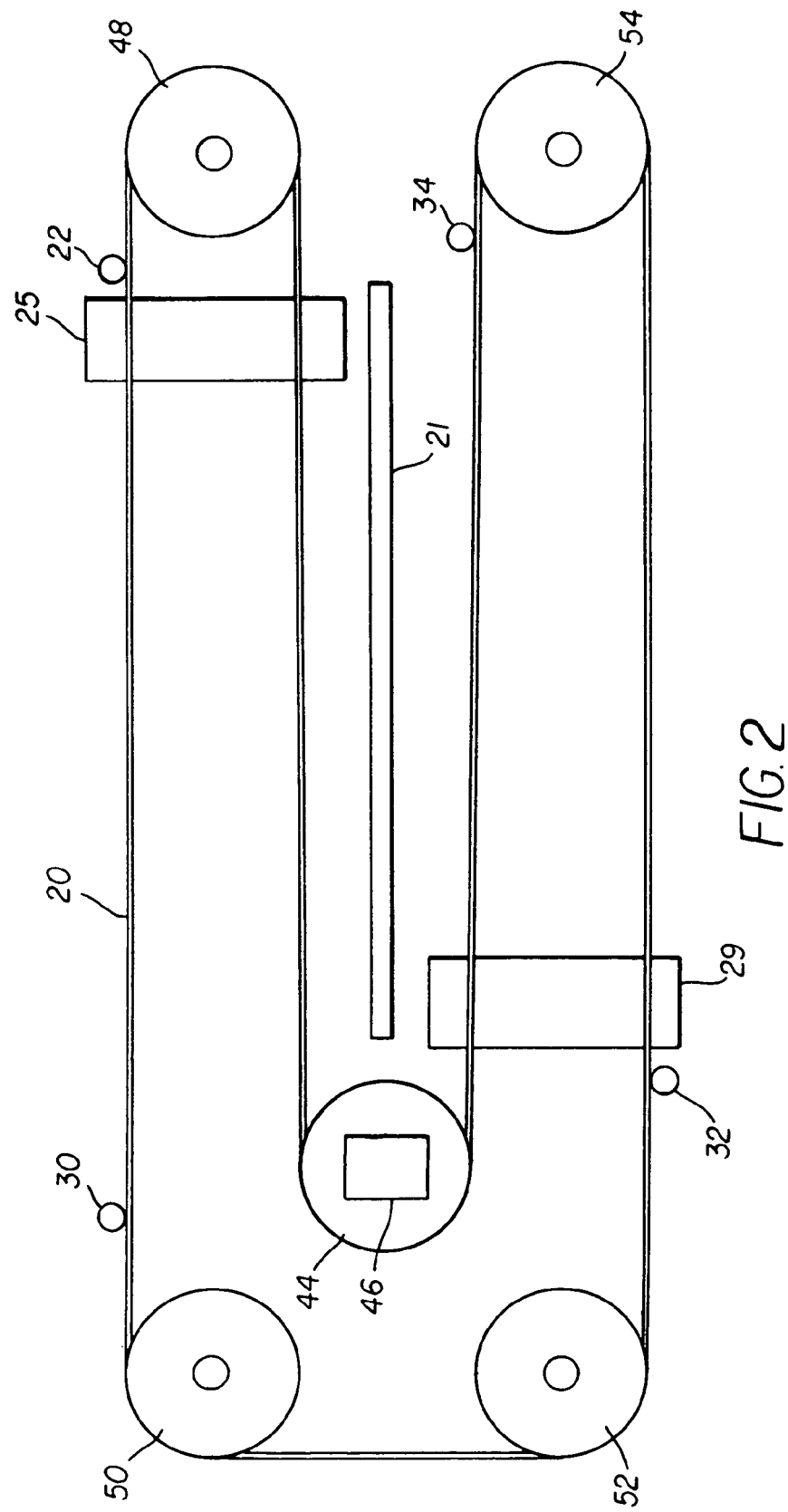
FIG. 2 is a schematic of the invention in the first and third positions.
Figure 3:
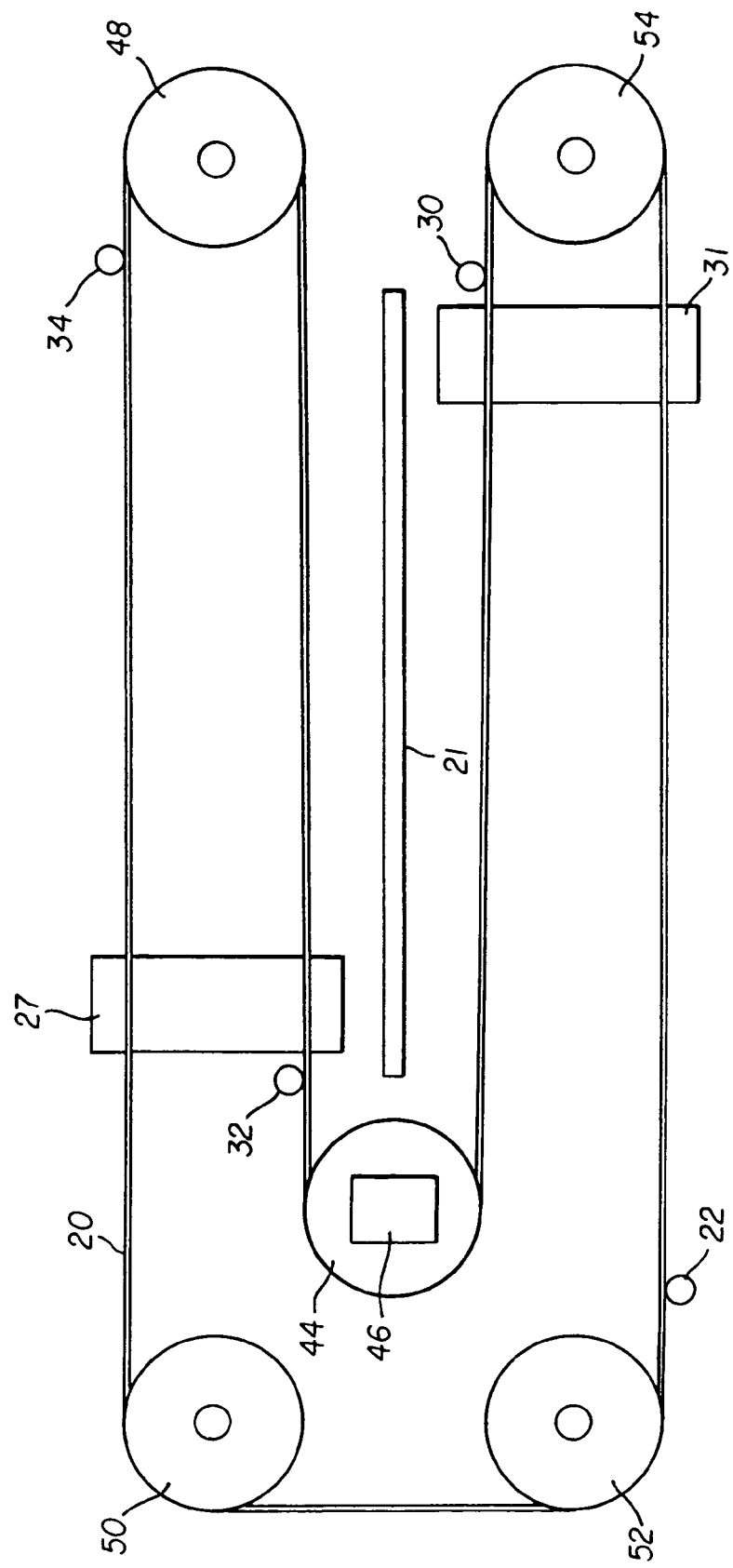
FIG. 3 is a schematic of the invention in the second and fourth positions.
Figure 4:
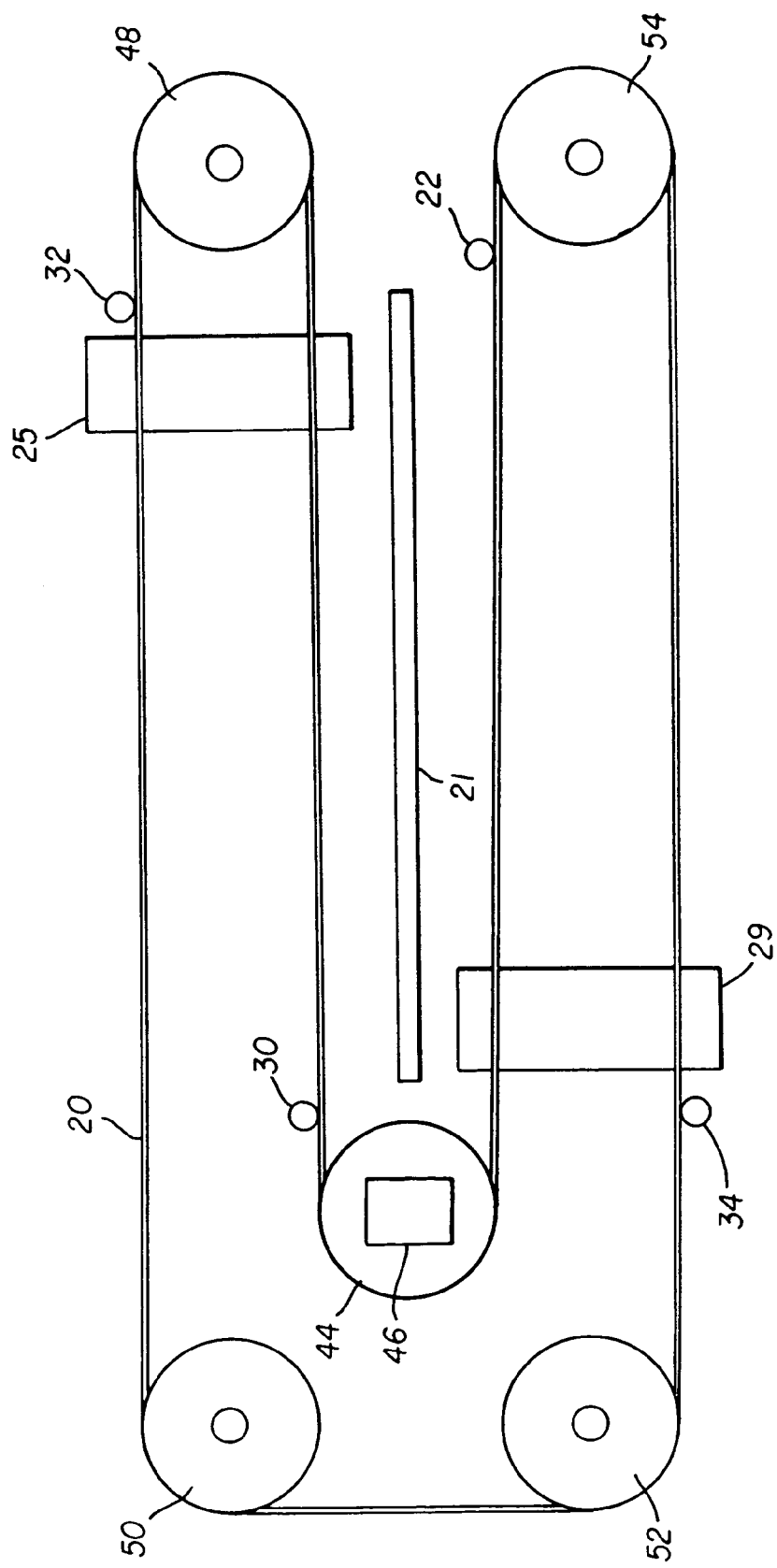
FIG. 4 is a schematic of the invention in the first and third positions.
Figure 5:
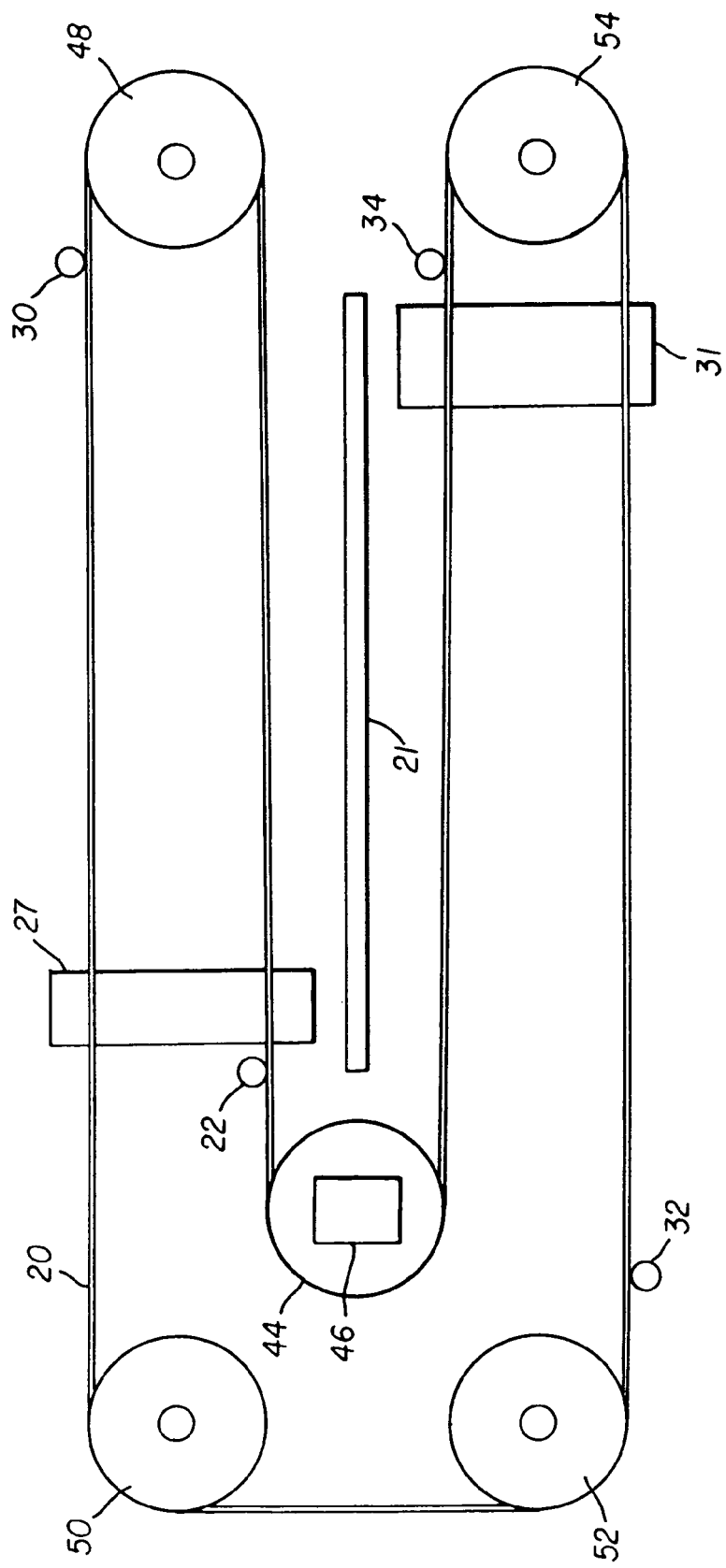
FIG. 5 is a schematic of the invention second and fourth positions.

FIG. 2 and FIG. 4 depict the first and second scanning stages 10 and 12 at the first and third positions 25 and 29, respectively. FIG. 3 and FIG. 5 depicts the first and second scanning stages 10 and 12 at the second and fourth positions 27 and 31, respectively. FIGS. 2 through 5 depict examples of the possible positions of the four pins 22, 30, 32, and 34 in moving the scanning stage 10 and 12.

A two pin method can drive the two stages. The invention contemplates that other configurations can also be used to drive the two stages. The figures depict the embodiment of a four-pin method driving the two stages.

In particular, a drive cable 20, which can be a belt or a cable has a first pin 22 for simultaneously engaging with a scanning stage slot disposed in the scanning stage. The first pin 22 engages the scanning stage slot; the drive cable pulls the first pin and the stage and thereby moves the scanning stage from a first position 25 as shown in FIG. 3 to a second position 27.

The drive cable 20 has a second pin 30 for simultaneously engaging with the balancing stage slot while the first pin 22 is engaged with the scanning stage slot. The first pin as connected to the drive cable, moves the scanning stage in a direction opposite from the second pin as connected to the drive cable engaging the balancing stage slot from a third position 29 to a fourth position 31.

The drive cable then can engage the second pin 30 and continues to engage the balancing stage via the balancing stage slot and a third pin 32 engages the slot in the scanning stage. The second pin 30 moves the balancing stage in reverse from the fourth position 31 to the third position 29. The second pin moves the scanning stage in a reverse direction from the second position to the first position. In this second movement, third pin and second pin drive the two stages simultaneously.

The drive cable 20 has a fourth pin 34 for engaging the balancing stage slot and moving the balancing stage from the third position 29 to the fourth position 31. Simultaneously with the movement of the scanning stage using the fourth pin, the third pin engages the scanning stage slot and moves the scanning stage from the first position 25 to the second position 27.

In the fourth cycle, the drive cable has the first pin engaging the scanning stage slot and the fourth pin engages the balancing stage. The first pin moves the scanning stage from second position to the first position and the fourth pin moves the balancing stage from the fourth position to the third position. The cycle then repeats itself.

The effect of these pin engagements in the stage slots using the drive cable is to achieve a smooth counterbalanced continuous motion of one stage relative to the other stage.

A drive pulley 44 connects to a drive motor 46 for rotating the drive pulley and thereby moving the drive cable with the pins. Four idler pulleys, 48, 50, 52, and 54 can be used with the drive cable 20 to support motion of the drive cable.

The invention contemplates a two pin embodiment of the invention described above wherein a high speed counterbalanced translation device has a scanning stage having a scanning stage slot. The scanning stage is adapted for movement in a first direction and a second direction along a first axis. The device further has a balancing stage having a balancing stage slot. The balancing stage is disposed opposite the scanning stage and is adapted for movement in a third direction and a fourth direction along a second axis. At least one, but optionally two or more scanning modules can be disposed over the scanning stage. A continuous drive cable is connected to and engages a drive pulley with drive motor for rotating the drive pulley. The cable, which can be a belt includes a first pin for sequentially moving the scanning stage in from a first position to a second position by engaging the first scanning stage slot, a second pin for moving the balancing stage simultaneously with scanning stage initially in a third position to the fourth position by engaging the balancing stage slot, and then in sequence the first pin then moves the balancing stage from the fourth position to the third position while second pin moves the scanning stage from the second position to the first position.

This embodiment contemplates that the first axis is parallel to the second axis.

Figure 6:
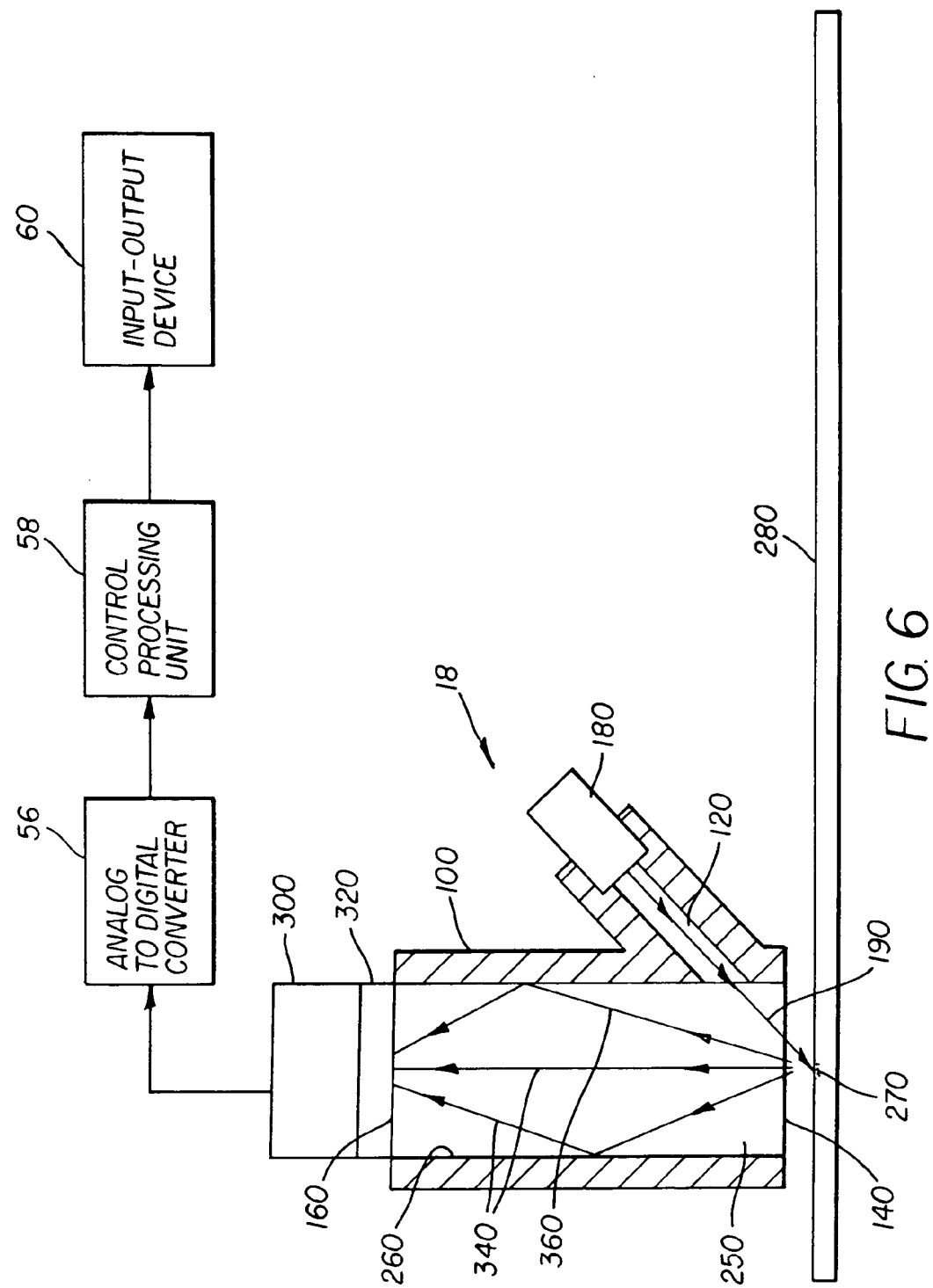
FIG. 6 depicts a side view of the scanning module.

Both embodiments of the invention contemplate that the speed of the scanning modules are the same, and between 10 inches per second and 80 inches per second, preferably 45 inches per second. It is possible that there could be a variation between the speed of the first scanning module and the second scanning module, and those speed would be controlled by the control process unit (CPU) 58 that can be a the computer, to receives, compile and store the image signals from the modules. The control processing unit can be used to transmit the compiled images to an input-output device, such as a film writer or printer. FIG. 6 is a depiction of a side view of a scanning module for use within the invention.

The scanning module has a housing 100 with a channel 120 and the first and second openings 140 and 160. The scanning module also has cylindrical center chamber comprising a mirrored surface.

Within the housing 100, the scanning module has a laser 180 is oriented to generate a beam of stimulating electromagnetic radiation through the channel 120 into the first opening 140. The beam is preferably between 390 and 400 nm in size. The beam flows through the first opening 140 onto a stimulated spot 270 on a photo-stimulatable radiographic sheet 280. Light 340 is emitted from the stimulated spot and reflected light 360 bounces from the radiographic sheet 280 to enter the first opening 140. The emitted light 340 is then transmitted from the center channel out of the second opening 160 to the filter 320. The filter 320 only permits the light emitted from the stimulated spot 270 to pass to the light detector 300.

In a preferred embodiment, the center chamber 250 has the following dimensions: a length between 20 mm and 30 mm, preferably about 25 mm; a height between 20 mm and 25 mm, preferably about 20 mm; and a width between 20 mm and 25 mm, preferably about 20 mm.

Returning to FIG. 6, the light detector 300 is disposed in the second opening for receiving light from filter 320 also disposed at the second opening of the housing.

In the most preferred embodiment, the housing 100 can be a one-piece molded structure of a strong polycarbonate, a strong plastic, or a metal. A preferred overall dimension of the housing is a height of 54 mm, a width of 35 mm, and a length of 25 mm.

Alternatively, the housing 100 can be a two-piece construction. In the two-piece construction, the two halves can be joined by conventional attaching devices, such as a latch, welds, or one or more screws.

Figure 7:
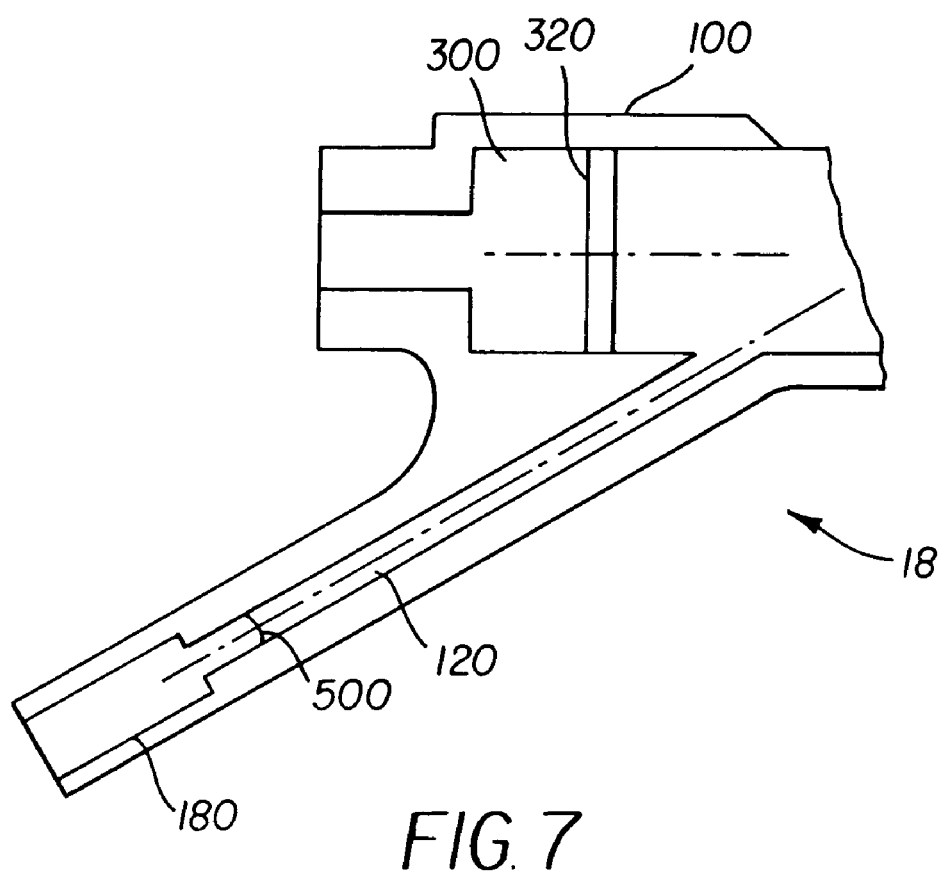
FIG. 7 depicts a side view of the scanning module with a collimator lens.

FIG. 7 depicts an embodiment of a scanning module 18 for emitting light to and collecting light from a photo-stimulatable radiographic sheet. The housing 100 includes a channel 120, a first opening 140, and a second opening 160. The laser 180 is disposed in the housing and generates a beam 190 of stimulating electromagnetic radiation through the channel 120 into the first opening 140.

The beam 190 can in one embodiment pass through a collimator lens 500 prior to passing out of the channel 120.

Another embodiment is a system for emitting light to and collecting light from a photo-stimulatable radiographic sheet and then storing the image. The system includes a scanning module 18 for emitting light to and collects light from a photo-stimulatable radiographic sheet. The scanning module is the same as the module of FIG. 6.

In another embodiment, individual modules can be placed on a rotating disc over a stationary plate to achieve faster scanning of an image. The use of the modules on a rotating disc provides a smooth, even scanning of the image.

Figure 8:
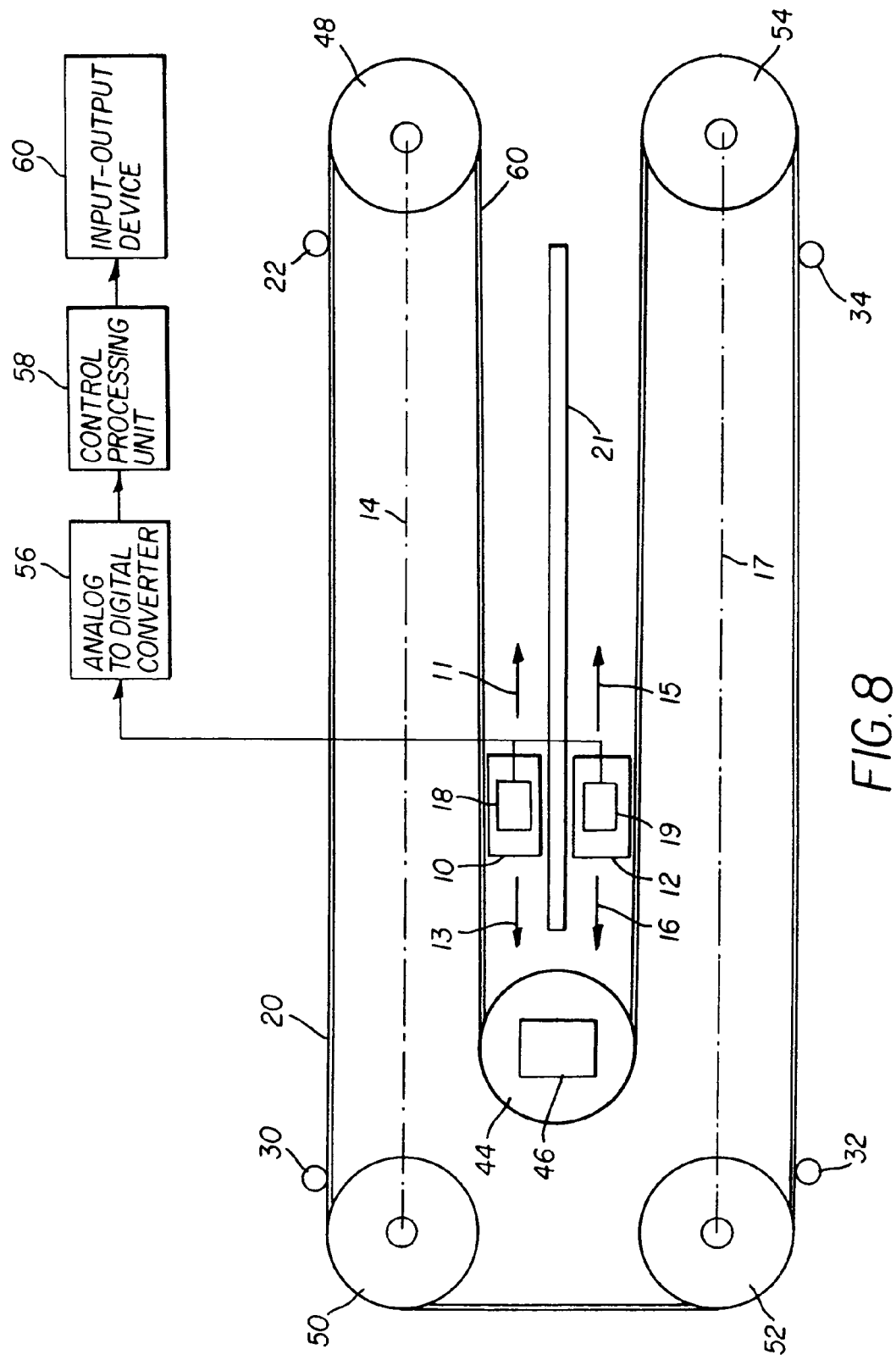
FIG. 8 is a schematic of the system.

FIG. 8 illustrates one or more scanning modules that could be used in this system. Further the light detector 300 is shown in communication, such as by a wireless link, with an analog to digital converter 56 adapted to receive signal from the light detector 300.

A control processing unit 58 converts signal to signal from the analog to digital converter 56. The control processing unit 58 is capable of storing the now digital signal.

The system includes an output device 60 adapted to receive the digital signal from the control processing unit 58. The CPU can be a computer such as a PC or MAC, for compiling signals from one or more modules. The output device can be a film writer, printer, or display.

Embodiments of the invention further include a high speed counterbalances scanning system for use with radiographic media. The system includes a scanning stage comprising a scanning stage slot, wherein the scanning stage is adapted for movement in a first direction and a second direction along a first axis, a balancing stage comprising a balancing stage slot, wherein the balancing stage is disposed opposite the scanning stage and is adapted for movement in a third direction and a fourth direction along a second axis and a scanning module mounted on the scanning stage.

The system further includes a counterbalance module attached to the balancing stage comprising a weight and a size that complements the scanning module weight and size.

In addition, the system includes a continuous drive cable engaging a drive pulley with a drive motor for rotating the drive pulley, wherein the cable further includes a first pin for sequentially moving the scanning stage from a first position to a second position by engaging the first scanning stage slot and a second pin for moving the balancing stage simultaneously with the scanning stage initially from the third position to the fourth position by engaging the balancing stage slot; and thereafter, the first pin moves the balancing stage from the fourth position to the third position while second pin moves the scanning stage from the second position to the first position.

The system further includes an analog to digital converter for receiving signals from the scanning module, a control processing unit in communication with the analog to digital converter and an output device for processing signals from the control processing unit.

The invention has been described in detail with particular reference to certain preferred embodiments thereof, but it will be understood that variations and modifications can be effected within the scope of the invention.

Parts List 10 scanning stage
11 first direction
12 balancing stage
13 second direction
14 first axis
15 third direction
16 fourth direction
17 second axis
18 scanning module
19 counterbalance module
20 drive cable
21 radiographic media
22 first pin
25 first position
27 second position
29 third position
30 second pin
31 fourth position
32 third pin
34 fourth pin
44 drive pulley
46 drive motor
48 first idler pulley
50 second idler pulley
52 third idler pulley
54 fourth idler pulley
56 analog to digital converter
58 control processing unit
60 input-output device
100 housing
120 channel
140 first opening
160 second opening
180 laser
190 beam
250 cylindrical center chamber
270 stimulated area or spot
280 radiographic sheet or media
300 light detector
320 filter
340 emitted light
360 reflected light
500 collimator lens

What is claimed is:

1. A high speed counterbalanced translation device for use with radiographic media comprising:
  a) a scanning stage comprising a scanning stage slot, wherein the scanning stage is adapted for movement in a first direction and a second direction along a first axis;
  b) a balancing stage comprising a balancing stage slot, wherein the balancing stage is disposed on an opposite side of the radiographic media from the scanning stage and is adapted for movement in a third direction and a fourth direction along a second axis;
  c) a scanning module mounted on the scanning stage;
  d) a counterbalance module attached to the balancing stage comprising a weight that complements a scanning module weight; and
  e) a continuous drive cable engaging a drive pulley with a drive motor for rotating the drive pulley, wherein the cable further comprises:
    i) a first pin for sequentially moving the scanning stage from a first position to a second position by engaging the first scanning stage slot; and
    ii) a second pin for moving the balancing stage simultaneously with the scanning stage from a third position to a fourth position by engaging the balancing stage slot; and, wherein the first pin subsequently moves the balancing stage from the fourth position to the third position while second pin moves the scanning stage from the second position to the first position.

2. The device of claim 1 wherein the continuous drive cable is a belt.

3. The device of claim 1 wherein the first axis is parallel to the second axis.

4. The device of claim 1 wherein four pins are used to move the two stages sequentially, one relative to the other.

5. The device of claim 1 wherein the speed of the scanning module is between 10 inches per second and 80 inches per second.

6. The device of claim 5 wherein the speed of the scanning module is 45 inches per second.

7. The device of claim 1 wherein the radiographic media comprises a phosphorous plate.

8. The device of claim 1 wherein the radiographic media comprises a plate, sheet, screen or a combination thereof.

9. The device of claim 1 wherein the scanning module is adapted for emitting light to and collecting light from a photo-stimulatable radiographic sheet and wherein the scanning module comprises:
  a) a housing comprising a channel; a cylindrical center chamber in communication with the channel comprising a mirrored surface; a first opening communicating with the cylindrical chamber; and a second opening communicating with the cylindrical chamber;
  b) a laser is disposed in the housing and adapted to generate a beam of stimulating electromagnetic radiation through the channel and the first opening onto a stimulated area of the photo-stimulatable radiographic sheet, and wherein the stimulated spot emits light and reflected light to enter the first opening and the cylindrical chamber;
  c) a light detector disposed in the second opening for receiving light emitted and reflected into the cylindrical chamber; and
  d) a filter disposed at the second opening of the housing for selectively passing only the emitted light from the stimulated area of the photo-stimulatable radiographic sheet to the light detector.

10. A high speed counterbalances scanning system for use with radiographic media comprising:
  a) a scanning stage comprising a scanning stage slot, wherein the scanning stage is adapted for movement in a first direction and a second direction along a first axis;
  b) a balancing stage comprising a balancing stage slot, wherein the balancing stage is disposed opposite the scanning stage and is adapted for movement in a third direction and a fourth direction along a second axis;
  c) a scanning module mounted on the scanning stage;
  d) a counterbalance module attached to the balancing stage comprising a weight and a size that complements a scanning module weight and size;
  e) a continuous drive cable engaging a drive pulley with a drive motor for rotating the drive pulley, wherein the cable further comprises:
    i) a first pin for sequentially moving the scanning stage from a first position to a second position by engaging the first scanning stage slot; and
    ii) a second pin for moving the balancing stage simultaneously with the scanning stage initially from the third position to the fourth position by engaging the balancing stage slot; and thereafter, the first pin moves the balancing stage from the fourth position to the third position while second pin moves the scanning stage from the second position to the first position;

f) an analog to digital converter for receiving signals from the scanning module;

g) a control processing unit in communication with the analog to digital converter; and h) an output device for processing signals from the control processing unit.

11. The device of claim 10 wherein the continuous drive cable is a belt.

12. The device of claim 10 wherein the first axis is parallel to the second axis.

13. The device of claim 10 wherein four pins are used to move the two stages sequentially, one relative to the other.

14. The device of claim 10 wherein the speed of the scanning module is between 10 inches per second and 80 inches per second.

15. The device of claim 14 wherein the speed of the scanning module is 45 inches per second.

16. The device of claim 10 wherein the radiographic media comprises a phosphorous plate.

17. The device of claim 10 wherein the radiographic media comprises a plate, sheet, screen or a combination thereof.

18. The device of claim 10 wherein the scanning module is adapted for emitting light to and collecting light from a photo-stimulatable radiographic sheet and wherein the scanning module comprises:

a) a housing comprising a channel; a cylindrical center chamber in communication with the channel comprising a mirrored surface; a first opening communicating with the cylindrical chamber; and a second opening communicating with the cylindrical chamber;

b) a laser is disposed in the housing and adapted to generate a beam of stimulating electromagnetic radiation through the channel and the first opening onto a stimulated area of the photo-stimulatable radiographic sheet, and wherein the stimulated spot emits light and reflected light to enter the first opening and the cylindrical chamber;

c) a light detector disposed in the second opening for receiving light emitted and reflected into the cylindrical chamber; and d) a filter disposed at the second opening of the housing for selectively passing only the emitted light from the stimulated area of the photo-stimulatable radiographic sheet to the light detector.

* * * * *